July 15, 1941.    G. A. MOORE    2,249,392
CONTAINER AND METHOD OF MAKING THE SAME
Filed Aug. 16, 1938    3 Sheets-Sheet 1
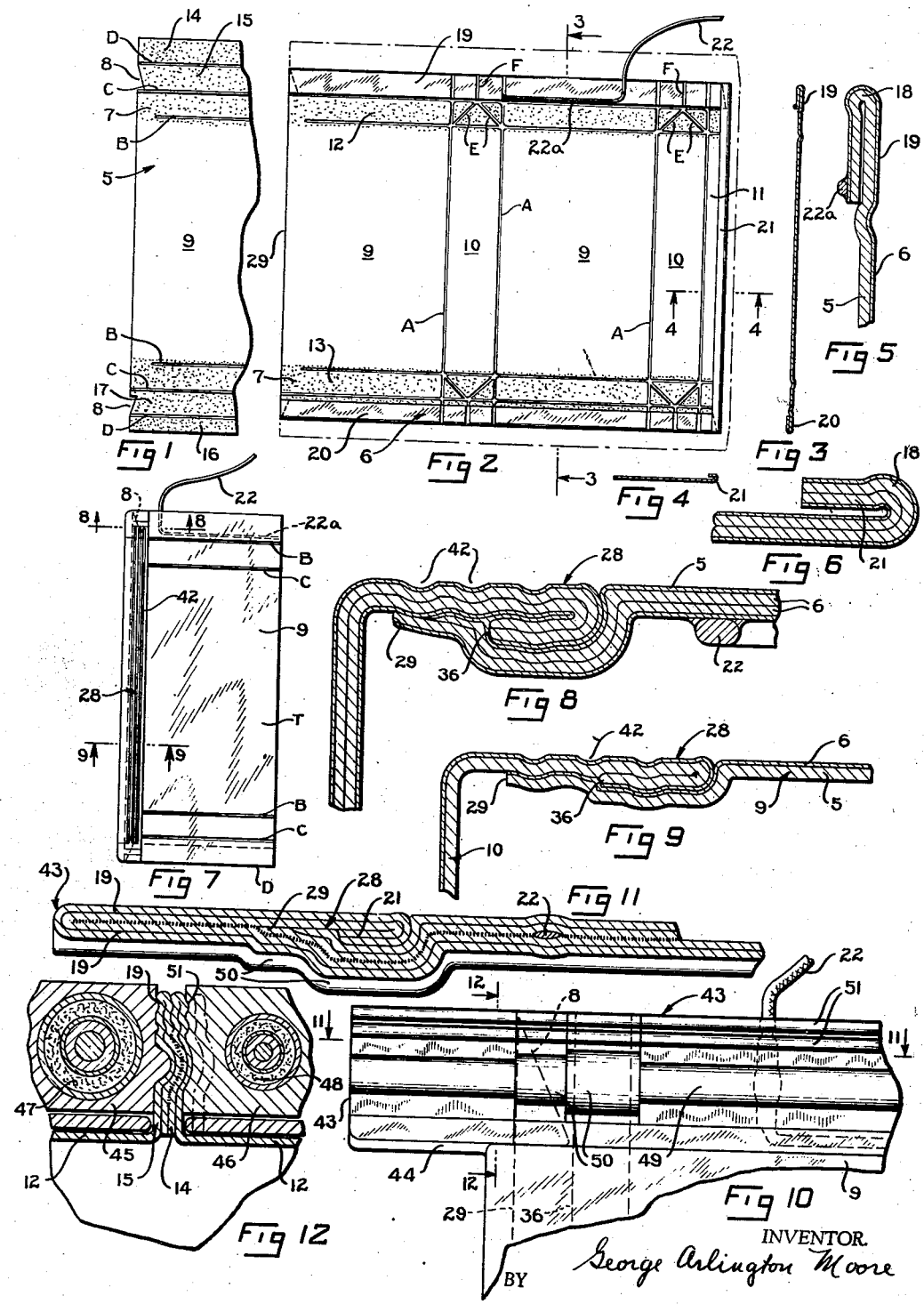
INVENTOR.
George Arlington Moore
BY
F. Bascom Smith
ATTORNEY.

July 15, 1941.  G. A. MOORE  2,249,392
CONTAINER AND METHOD OF MAKING THE SAME
Filed Aug. 16, 1938  3 Sheets-Sheet 2
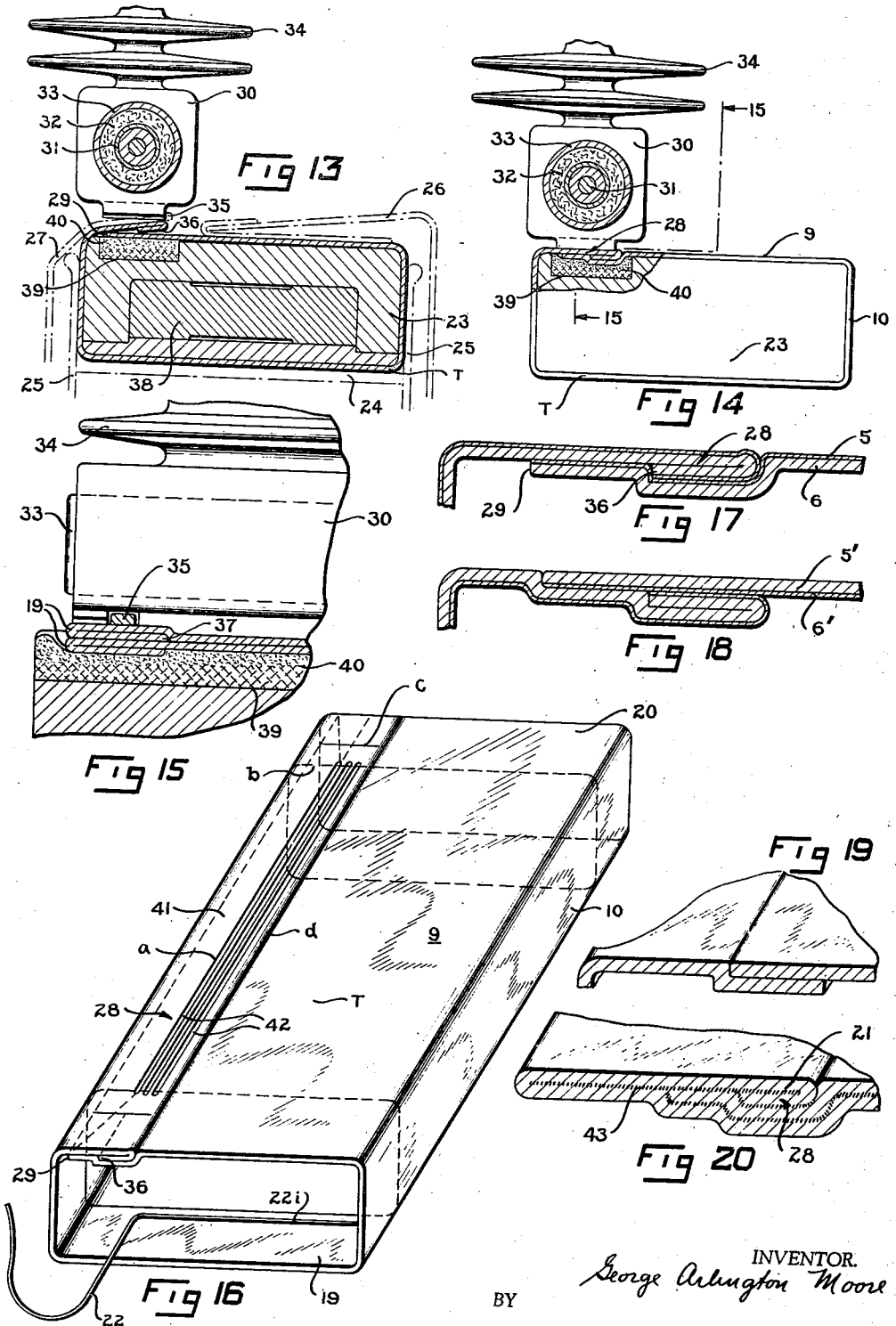
INVENTOR.
George Arlington Moore
BY
F. Bascom Smith
ATTORNEY.

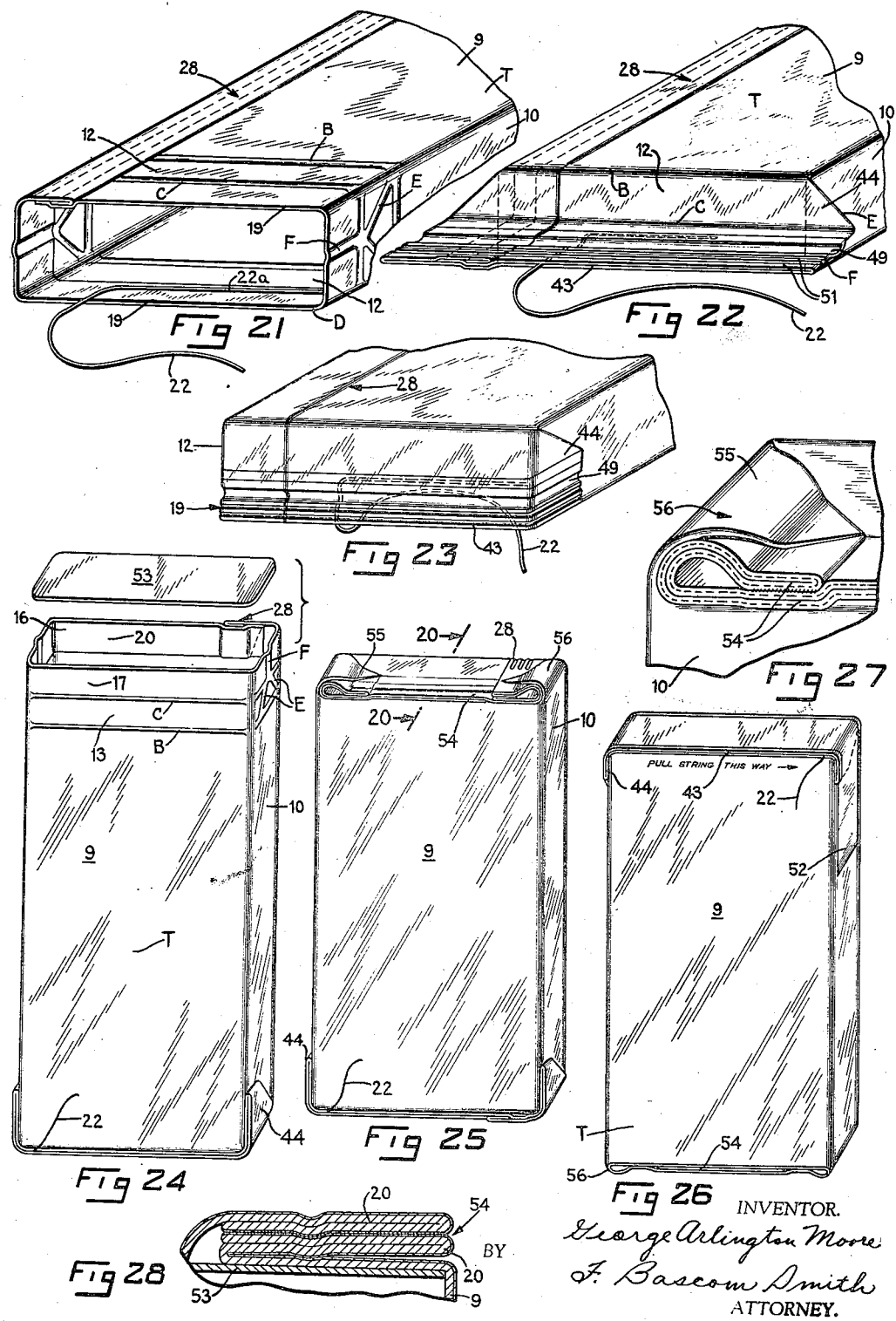

Patented July 15, 1941

2,249,392

UNITED STATES PATENT OFFICE 2,249,392

CONTAINER AND METHOD OF MAKING THE SAME

George Arlington Moore, Louisville, Ky., assignor to Humoco Corporation, Louisville, Ky., a corporation of Delaware Application August 16, 1938, Serial No. 225,114

16 Claims. (Cl. 93—36)

This invention relates to containers and more particularly to methods and means for fabricating hermetic packages of a flexible nature for packaging tobacco and similar products which should be distributed and sold in hermetically sealed containers in order that the same may reach the consumer in factory fresh condition.

Exhaustive attempts have been heretofore made to produce a low-cost, hermetic package or container comprising inexpensive material, such as paper, but none of these prior attempts has met with even slight success, particularly in fields where rapid production is essential. These attempts have met with failure primarily because of the difficult problems involved in forming the necessary seams and joints capable of preventing the passage of air and moisture into and out of the finished container. It has been proved beyond any question of doubt that closure seams in containers of the above type cannot be rendered air-tight or moisture-proof by the mere application of pressure, i. e., by the compression of the materials from which the container is made. The solution of this problem has been found to lie in the use of suitable adhesives having a proper solids content and in compensating in various ways for multiple thicknesses of the materials embodied in the seams. Vegetable and animal adhesives and paraffin wax which are in common use as sealing materials are wholly unsatisfactory insofar as the provision of hermetic seams is concerned. These sealing materials lack, among other inherent shortcomings, proper adhesives and the same set so slowly as to render the same impractical for use in fabricating containers by means of modern high speed machinery. The time factor, which is so important in competitive production, makes it impossible to use wax and adhesives of the above character even if these materials were otherwise satisfactory. Additionally, manipulation of the container walls after formation of certain of the seams is almost universally necessary and in many instances this manipulation is quite severe and is effective to seriously injure seams involving slow setting adhesives or weak bonds of wax.

Some attempts have been made in recent years to provide hermetic seams in fibrous containers by utilizing thermoplastic lacquers and adhesives, but these attempts have also met with failure in commercial production because of the failure to properly activate the adhesive and because of the tendency of the common thermoplastic adhesives to become tacky at factory temperatures and cause the materials to stick together before fabrication of the container. The methods of heat sealing and the means for carrying out said methods heretofore employed have either failed to activate the dry thermoplastic adhesive or have created a heat reservoir adjacent the seam, thereby preventing quick setting of the adhesive. This failure of prior heat sealing methods to produce hermetic seams has resulted in a large measure from the fact that fundamental principles of heat transfer have been ignored. The methods of the present invention employ unidirectional heat flow at a sufficiently low rate to properly activate the adhesive during the comparatively short sealing period and avoid the storage of heat in such quantities as will materially hinder the setting action of the adhesive, quick setting being essential in order to prevent separation of the seam by reason of the tension in the folded materials and to prevent damage during subsequent fabricating steps which may follow in rapid succession in commercial production.

Failure to provide impervious heat sealed seams has resulted also from failure to compensate for multiple thicknesses of the materials. It is necessary to compensate in some way for variations in the number of thicknesses of material involved in different parts of a seam, especially when the material is of a non-compressible nature. Varying thicknesses, which invariably occur in at least some of the seams in a complete container, have heretofore prevented the application of sufficient sealing pressure at all points along the seam, and hence minute holes and unsealed spaces, which permit the passage of air and moisture into and out of the container occur unless compensation is made for said variation. Efforts to compensate for these variations by relieving the pressure dies has not proved successful.

Ordinary untreated paper is not moisture-proof but is very absorbent and is effective to absorb moisture from the surrounding atmosphere or from materials with which it contacts, such as the contents of a container made of such paper. To avoid this absorbing action, it has been heretofore propose to coat or impregnate the paper component of the walls of a container with paraffin wax. Paper thus treated in accordance with methods heretofore known will not take proper adhesives and accordingly cannot have adjacent surfaces thereof joined or sealed together in an air-tight, moisture-proof manner to provide a strong, hermetic package.

Additionally, wax applied by methods heretofore known has a detrimental effect on certain products, such as tobacco, for example. The present invention provides a novel method for treating the paper component of a package whereby the same is rendered moisture repellent and yet capable of taking an adhesive substance. This novel treatment also lubricates the fibres of the paper so that the same are able to withstand the folding and bending to which they are subjected during the fabrication process.

In packaging products, such as cigarettes for example, to protect the same against loss of moisture content and aroma, the common practice has been to package such products in a loosely sealed non-hermetic container and surround the latter with one or more wrappers of Cellophane or like material. When the consumer desires to use the contents the wrapper can be torn away and the loosely sealed package can be readily opened, and thereafter used as a container to protect the contents during the consumption thereof. This type of package requires a comparatively large quantity of materials and comparatively complicated and expensive machinery and labor are required to make the same. In containers wherein the wrappers have been dispensed with and attempts have been made to seal the more simplified and less expensive package in an hermetic manner, no satisfactory means have been provided for opening the same without tearing and hence mutilating the package, thereby rendering the latter less useful as a protective container during the consumption of the contents. The present invention embodies means whereby an hermetically sealed package made from flexible, fragile materials may be readily opened without detriment to said materials.

One of the objects of the present invention is to provide a novel flexible container or package comprising fibrous material which is substantially impervious to both air and moisture.

Another object of the invention is to provide a novel method for fabricating an air-tight, moisture-proof container from a single foldable blank comprising fibrous material.

Another object is to provide a novel method for treating fibrous materials to render the same less absorbent without materially affecting the affinity thereof for adhesives.

Still another object is to provide a novel container made from a blank of foldable material, said blank being cut in a novel manner to compensate for multiple thicknesses in the closure seams of the container.

A further object is to provide novel methods for producing containers whereby the heat sealed seams or junctures are rendered strong, durable, and impervious to both air and moisture.

A still further object is to provide a novel method and novel means for insuring quick and proper activation by heat and pressure of a dry, thermoplastic adhesive film interposed between the adjacent surfaces of parts to be joined together, without hindering the quick setting of said adhesive after the application of heat and pressure is discontinued.

Another object is to provide novel means and methods for heat sealing the seams of a container or similar junctures, whereby sealing at all points along the seam, and hence the imperviousness thereof, is assured.

Another object is to provide novel and improved means for opening a container without danger of damaging or tearing the thin, fragile material from which the container is made.

Another object is to provide a novel opening device for a container which is impervious to moisture and does not wick moisture by capillary action into or out of the container and which is conveniently arranged and so apparent that it will be readily observed and used by the consumer of the contents of the container without previous instructions.

The above and further objects and novel features of the invention will more fully appear from the following detailed description when the same is read in connection with the accompanying drawings. It is to be expressly understood however that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a development of a portion of the inner surface of a blank which may be employed in making one form of container comprehended by the present invention;

Fig. 2 is a plan view of said blank with three marginal portions thereof folded inwardly and novel opening means applied thereto, the original outline of the blank being shown by dot and dash lines;

Figs. 3 and 4 are sectional views taken substantially on lines 3—3 and 4—4, respectively, of Fig. 2;

Figs. 5 and 6 are detail sectional views, on enlarged scales, taken on lines 5—5 and 6—6, respectively, of Fig. 2;

Fig. 7 is a side elevation of a tubular body formed from the blank of Fig. 2;

Figs. 8 and 9 are detail sectional views, on enlarged scales, showing different portions of the side seam of said body, the sections being taken on lines 8—8 and 9—9, respectively, of Fig. 7;

Fig. 10 is an enlarged detail view, with parts broken away, showing a portion of said body and an end closure seam therefor in side elevation;

Fig. 11 is an enlarged detail view of said end closure seam partly in section and with parts broken away, the section being taken on line 11—11 of Fig. 10;

Fig. 12 is a detail view, on an enlarged scale and with parts broken away, showing a vertical section of said end closure seam and means for forming the same, the section through the seam being taken substantially on line 12—12 of Fig. 10;

Fig. 13 is an end elevation, partly in section and with parts broken away, illustrating one form of apparatus for forming the longitudinal side seam of the container body of Fig. 7;

Fig. 14 is a similar view showing the sealing iron in operative position;

Fig. 15 is an enlarged side elevation of said apparatus partly in section and with parts broken away, the section being taken substantially on line 15—15 of Fig. 14;

Fig. 16 is an enlarged isometric view of one form of container body comprehended by the present invention;

Figs. 17, 18, 19 and 20 are cross sectional detail views illustrating various types of seams and joints which may be formed in carrying out the heat sealing method comprehended by the invention;

Fig. 21 is an enlarged scale isometric view of a portion of an open ended body made from the blank of Fig. 2;

Fig. 22 is a similar view after the formation of the top closure seam of the container;

Fig. 23 is also a similar view showing the top closure seam folded down against the body;

Fig. 24 is an isometric view of the container in inverted position ready for having a flat supporting closure inserted therein after being filled with the desired contents;

Fig. 25 is an isometric view of a completed container in inverted position to show the bottom thereof;

Fig. 26 is an isometric view of the completed container in upright position;

Fig. 27 is a detail isometric view, on an enlarged scale and with parts broken away, of one corner of the bottom of the container when the latter is in inverted position as seen in Fig. 25; and, Fig. 28 is a detail sectional view, on an enlarged scale and with parts broken away, of the bottom closure seam of the container, the section being taken on line 28—28 of Fig. 25.

One embodiment of the novel container comprehended by the present invention may be fabricated in accordance with the novel method of the invention from a single blank of foldable material. Said blank preferably comprises a layer 5 of paper secured to a layer 6 of impervious material, such as sheet aluminum, by means of an elastic adhesive. It is to be understood that said layers may be of any desired relative thickness and that they may be secured together throughout their entire areas, preferably by an adhesive which will not crystallize but will have a degree of flexibility and will not crack or flake when the blank is folded. One suitable adhesive for this purpose is constituted by a combination comprising latex and casein. The fibrous layer of material gives body, strength and toughness to the laminated blank 5, 6 while the metallic material or foil renders the same impervious to air and moisture.

After the paper and foil layers are secured together in the above manner, the former may be treated in a novel manner to render the same moisture resistant, without destroying the affinity thereof for adhesives, and to lubricate the fibres thereof in order that the same may better withstand the folding and bending to which they are subjected during the fabricating process. Said moisture proofing process comprises coating the surface of fibrous lamina 5 with a suitable coating of wax and thereafter subjecting the same to a baking heat until the wax-coated surface is dry and free of surplus wax. The baking process impregnates the fibrous lamina with wax and produces a surface thereon capable of receiving films of lacquer and other suitable thermoplastic adhesive materials. Care should be exercised not to have the wax unduly offset to the side of the paper lamina which is secured to foil lamina 6. When using a good grade of paper having the desired strength for use in tobacco containers, for example, it has been found that about 7 lbs. of wax per ream of paper produces a coating that is satisfactory. The wax reduces the moisture absorbing capacity of the paper and lubricates the fibres thereof to thereby increase the ability of the paper to withstand the bending and folding to which the same is subjected during the process of fabricating the container from blank 5, 6.

After the material constituting blank 5, 6 has been treated in accordance with the novel method above described, the foil surface thereof is coated, for a purpose to more fully appear hereafter, with a film of thermoplastic lacquer having potential adhesive properties. One lacquer which has been found suitable in carrying out the invention is Beckwith-Chandler lacquer No. 017,308 which has a solids content of about 26%. The lacquer is applied to the surface of foil layer 6 in liquid form and is thoroughly dried before the folding thereof into container form is commenced, a suitable quantity of lacquer per ream of mounted material being approximately 3 to 3½ lbs. The lacquer thus applied to the foil serves as a heat or solvent activatable sealing medium, whereby superposed or engaging surfaces of blank 5, 6 may be secured together in an impervious manner during the fabrication of the container to be made from said blank. Said lacquer also has the properties of forming a protective film on the surface of the foil to prevent oxidation thereof, producing a foundation for printing inks, and producing a gloss which enhances the appearance of the package. For the purpose of printing advertising matter and the like on the lacquer coated foil surface, inks made by grinding dyes in glycerol-phthalate modified with linseed oil are preferably employed. Such inks have an affinity for the lacquer foundation and produce a very desirable color, body and gloss.

In addition to the lacquer coating on foil lamina 6, the fibrous lamina of the blank is striped along the top, bottom and right hand margins of the blank, as the latter is viewed in Figs. 1 and 2, with a thermoplastic adhesive material indicated at 7. This adhesive material should be so constituted that it will not have too strong an affinity for the lacquer on foil layer 6, and hence cause the blanks to adhere to one another at normal factory temperatures and hinder the fabricating process by blocking. In one commercial embodiment of the invention wherein the Beckwith-Chandler nitro-cellulose lacquer, referred to above, was used on the foil lamination, Pliolite, a chlorinated rubber product, was satisfactorily employed for striping the margins of the fibrous lamination.

Preferably, the foil and paper laminations of blank 5, 6 are secured together from rolls treated with wax, coated with thermoplastic lacquer and adhesive in the manner above described, and thereafter cut into blanks of the desired size and shape. For making the novel container comprehended by this invention, substantially rectangular blanks having a pair of oppositely disposed triangular notches 8 in the left end thereof, as viewed in Fig. 2 of the drawings, are cut from the laminated sheet material. Said notches are cut with the apices thereof short distances from opposite margins of the blank and serve, in a manner to appear hereafter, to facilitate the provision of impervious end closure seams for the completed containers.

In preparing blank 5, 6 for folding and sealing to make the novel container illustrated, said blank may be embossed or creased, either before or after the blank is cut from the laminated sheet material, to provide a plurality of folding lines, such, for example, as transverse lines A, which divide the blank longitudinally into wide and narrow panels 9 and 10, respectively, adapted to form the side walls of a rectangular container, and an end section or tab 11. Longitudinal lines or grooves B, C, and D may be disposed parallel to each other and to the upper and lower edges of the blank to thereby form top and bottom closure sections 12 and 13, respectively, and top and bottom seam sections 14, 15 and 16, 17, respectively. It may be noted that notches 8 are cut in the ends of and extend substantially across sections 15 and 17. Diagonal lines E may be disposed between lines B and C on the panels 10 of the blank and transverse lines F may extend from the intersection of the diagonal lines E to the edges of the blank. Lines E and F facilitate the proper folding of the top and bottom sealing tabs or flanges in a manner to be hereinafter described. All of the folding lines are preferably embossed in blank 5, 6 by suitable platens in such a way that the fold along each line will be toward the grooved side thereof, thereby giving the bend a rolled effect, as best seen at 18 in Figs. 5 and 6. Unduly sharp bending of the material and undue stretching of the outer lamination at each fold line are thus prevented and any cracking or breaking of the material which would destroy the permeability thereof is accordingly insured against.

The initial folding of blank 5, 6 consists in folding sections 14 and 16 inwardly along grooves D and into overlapping relation with sections 15 and 17, respectively, to thereby form top and bottom sealing flanges or hems 19 and 20 (Fig. 3). The margin of transverse section 11 is also folded inwardly to form a hem 21 at the end of blank 5, 6 opposite notches 8.

In order to provide means for readily opening the impervious container to be formed from blank 5, 6 a novel opening device is attached in a novel manner to the inner foil surface of hem 19 preferably while the blank is in the partially folded condition illustrated in Fig. 2. In the embodiment shown, said opening device comprises a flexible strip or strand of fibrous material, such as a string 22, a portion 22a of which extends longitudinally of the blank and engages the same near fold line C on the portion of hem 19 which forms in effect a continuation of one of the side panels 9. String 22 is preferably of a strong grade, such as cotton twine, treated with a thermoplastic lacquer in order to render the same substantially moisture or wick-proof and prevent moisture from being wicked by capillary action into or out of the container thereby. Lacquer may be applied to string or cord 22 in a novel manner by first passing the same through a bath of lacquer solvent, such, for example, as acetone, or through a lacquer thinner suitable for use in combination with the lacquer used. While in this saturated state the string is passed through a bath of the desired lacquer, preferably a nitro-cellulose lacquer having thermoplastic adhesive properties. Beckwith-Chandler lacquer No. 017,308 has been found suitable for this purpose. After coating the string with lacquer or other suitable moisture repellent adhesive material the same is thoroughly dried and preferably re-spooled for the machine which attaches the same to blank 5, 6. If desired, the string may be coated while spooled by placing the spool in a vacuum and successively soaking the same in a lacquer solvent and lacquer. One end of a short strip of the lacquer coated string is then attached to the metallic foil component of blank 5, 6 in the position illustrated (Fig. 2) by the application of suitable heat and pressure. The lacquer coatings on the string and foil constitute prime surfaces which are rendered tacky by heat and pressure and thereby effect a strong bond or anchorage between the string and the blank. The pressure also serves to flatten the portion of string 22 acted upon, thereby increasing the retaining surface thereof.

Blank 5, 6 with string 22 applied thereto, is next formed into a tubular body T preferably by folding the same about a mandrel or arbor with the ends of the blank in overlapping relation and heat sealing said overlapping ends together in a novel manner and with novel means to provide an impervious side seam for the container being constructed. As shown, blank 5, 6 is wrapped about a novelly constructed mandrel or arbor 23, (Fig. 13), with foil lamina 6 outermost, by some suitable mechanism, one embodiment of which is fully illustrated and described in the co-pending application of George Arlington Moore, Serial No. 173,101, filed November 6, 1937. A portion of said mechanism is shown in phantom in Fig. 13, and comprises a plate 24 for holding a central portion 9 of the blank against the lower face of arbor 23, a pair of plates 25 for folding the ends of the blank upwardly against opposite sides of the arbor, and members 26 and 27 for folding the ends of the blank inwardly against the upper face of the arbor and into overlapping relation to form a lap seam 28. It may be here noted that the inner edge 29 of the overlapping ends of the blank is, in effect, constituted by a single thickness of blank 5, 6 throughout the length of the body by reason of the fact that one thickness of each of the hems 19 and 20 is cut away at notches 8. The gradual transverse tapering of the seam 28 caused by notches 8 where said seam contains hems 19 or 20 may be best seen in Figs. 8 and 11.

In order to activate the adhesive film disposed on the engaging surfaces of the overlapping ends of blank 5, 6, the lapped portions may be engaged and pressed together by a sealing iron 30 which may be lowered and raised into and out of operative position by any suitable means (not shown). Said iron may be heated by any suitable means, electrical heating means being employed in the illustrated embodiment. The heating cartridge is removably mounted in iron 30 and comprises a heating coil 31 wound on a suitable core and surrounded by a magnesium insulator 32 and a metallic casing 33. Cooling fins 34 are provided on iron 30 for minimizing the transfer of heat from the latter to the supporting means therefor. For a purpose to appear hereinafter, the face of iron 30 may be relieved or recessed such as shown at the ends thereof, so that the marginal portions of hems 19 and 20 will not be subjected to material heat and pressure and to provide for the passage of yieldable fingers 35 which serve to hold the overlapping ends of blank 5, 6 in position during the descent of iron 30. If desired, fingers 35 may be omitted or may be integral with plate 27 which preferably extends substantially the full length of arbor 23.

It will be seen that in the formation of the longitudinal side seam to be formed by sealing the overlapping ends of blank 5, 6 together, a portion of the seam between the inner edges of hems 19 and 20 is made up partly by three thicknesses of the blank and partly by two thicknesses thereof, as best seen in Fig. 9. Adjacent each end of the body where the side seam contains hems 19 and 20, said seam is made up partly by six thicknesses of the blank, partly by four thicknesses, and partly by three thicknesses thereof, as best seen in Fig. 8.

In order to heat seal a seam comprising material, such as paper, having low heat conductivity, it is essential that there be intimate contact between the heating die and the material through which the heat must flow to reach the sealing film. It will be obvious then, that a seam of the character of seam 28 is difficult to heat seal in an impervious manner, since the thicker portions thereof prevent the hot sealing iron from coming into intimate contact with and supplying sufficient pressure to the thinner portions of the seam. Additionally, the particular seam or joint described above has an edge 36 of blank 5, 6 extending longitudinally thereof and the inner edges 37 (Fig. 15) of hems 19 and 20 extending transversely therethrough. Heretofore, it has been substantially impossible, even when comparatively thin stock was employed, to adhesively heat seal a seam in a manner to prevent leakage of air and moisture along the edges of the material passing through the seam, particularly when these edges were constituted by multiple thicknesses of the material employed. Inequality in the thicknesses of various portions of the blank itself and the difficulty of maintaining the working faces of the sealing iron or irons in parallel relation with the supporting mandrel or with each other, have also been material factors in the failure of others to heretofore produce imperviously sealed junctures in fibrous containers. The heating anvil and supporting mandrel can very easily have or develop slight irregularities in their contact surfaces which prevent the making and maintenance of intimate contact between the seam and anvil, and very slight distortion or irregularities of this character will leave spots along the seam at which the adhesive film is not properly activated. Where air is present in the seam as a result of insufficient contact and pressure, the adhesive film cannot be properly activated without undue prolongation of the heating period. Efforts have been made to compensate for the above irregularities and inequalities by contouring the operating faces of the sealing irons or supporting mandrel but it has been found to be impossible as a practical matter to obtain consistent registry with the necessary accuracy between the material of the seam and the sealing and supporting parts.

Another factor in the failure of others in this endeavor to provide an impervious adhesively sealed juncture between engaging surfaces of fibrous or like materials has been their failure to properly control the flow of heat and the storage thereof in the parts adjacent the seam and subject to the influence of the sealing die. For example, heat sealed junctures have been made heretofore by pressing two substantially equally heated sealing irons against opposite sides of the seam or by employing a hot sealing iron on one side of the seam and a cold metallic backing plate or supporting mandrel on the other side. In the first method, there is no actual flow of heat from one heating iron to the other through the adhesive film to be activated and such flow is necessary to obtain quick and proper activation of the dry film of adhesive. The heat flows from both sides of the center where the sealing film is ordinarily located, thereby causing an accumulation of gaseous pressure which is apt to rupture the seam or cause blisters therein as soon as the pressure exerted by the sealing irons is removed. Also, when two equally heated irons are used, the fibrous material becomes very hot and, being a poor conductor of heat, remains at a high temperature for an appreciable period after withdrawal of the heating irons, thereby preventing quick setting of the activated adhesive. In the second method mentioned above, the heat flows so rapidly from the hot iron to the cold metallic support that the adhesive film is not activated until a considerable amount of heat has been absorbed by said support. A proper heat balance must be maintained between the sealing iron and the seam supporting means or mandrel. When metal is used to support the seam directly under the sealing iron, a very high degree of heat must be employed to offset the rapid absorption of heat by the metal support and such degrees of heat are detrimental in that they cause decomposition of the lacquer coating, for example, on the outer surface of the seam, thereby detracting from the appearance of the finished container and at times, fouling the sealing irons. If a low heat is employed, the absorption thereof by the metal supporting structure is so rapid that the sealing film is never properly activated. Also, in high speed production, a properly heated sealing iron cannot ordinarily be held in contact with the seam sufficiently long to properly activate the adhesive film when a cold metallic supporting mandrel is employed. Even when the sealing film is properly activated, the large quantity of heat absorbed by the metallic support is effective to prevent quick setting of the activated adhesive if the seam remains in contact with said support. When quick setting is not obtained, air tends to enter the seam and the engaging portions thereof, being under some tension, tend to pull apart before setting takes place.

A novel method and novel means for practicing said method are accordingly provided as a part of this invention for overcoming the foregoing difficulties in the formation of heat sealed junctures. In the embodiment shown, said novel means comprises the novelly constructed mandrel or arbor 23, which, in the form shown, has a rectangular cross-section and is adapted to be slidably mounted on a support 38. Along the side of arbor 23 against which the overlapping ends of blank 5, 6 are pressed during the operation of sealing seam 28, said arbor is provided with a longitudinally extending groove or channel 39 in which a pressure equalizing pad or element 40 is firmly fixed. Said pad is of a resilient, yielding nature and preferably comprises an outer surface of rubber vulcanized onto a fabric base.

From the disclosures of Figs. 14 and 15, it will be evident that pad 40 yields under the pressure exerted by sealing iron 30 and presents a pressure-resisting face which permits the application of a substantial pressure to all parts of seam 28 irrespective of the varying thickness of the latter and irrespective of any misalignment between, or irregularities in, the operating faces of the supporting arbor and heating element. Yielding pad 40 compensates for said variations and irregularities and causes the layers of seam 28 to be pressed into close contact with each other and with the edges of the blank within the seam, such as edges 36 and 37. There will be a uni-directional flow of heat from iron 30 through seam 28 and, since pad 40 is constructed of materials having low heat conductivity, said flow will be at a sufficiently low rate that the adhesive film between the engaging surfaces of the seam will be quickly and adequately activated and pressed into the interstices of the material. Additionally, pad 40 absorbs little, if any, heat during the short heating interval and accordingly does not hamper the substantially instantaneous setting of the sealing film after withdrawal of the sealing iron. In one mechanism which has been constructed for carrying out the above described method, it has been found that in forming a juncture of the particular type described and embodying the materials stated, an efficient temperature for iron 30 is from 400° F. to 450° F. when the contact period is approximately one second and the pressure applied is from 1500 to 2000 pounds.

In sealing seams of the character of seam 28 which embody multiple folds, it has been found in practice that, if the entire seam is simultaneously contacted and pressed by the sealing iron, gases will be formed and trapped within said folds and cause blisters or rupture the material as soon as the external sealing pressure is released. If blisters are formed without causing ruptures, the trapped gases are very apt to rupture the fibrous and foil materials of the seam upon further folding of, or application of pressure to, the blistered portion. The gases referred to are formed principally by air trapped within the folds when the sealing iron abruptly and quickly engages the entire area of the seam and also by vaporization of the normal moisture content of the fibrous component of blank 5, 6, it being necessary that the fibrous material contain some moisture in order that best results in the working thereof may be obtained.

In the particular embodiment of the invention illustrated, it can be readily seen from Fig. 13 that if sealing iron 30 should move rapidly, as it does in practice, into contact with the entire area of longitudinal side seam 28, some air would be trapped within the space adjacent edge 36 of hem 21 and within the folds of hems 19 and 20. Additionally, since the heat from iron 30 will not flow through the multiple thicknesses of said hems as rapidly as it will through the two-ply portions of the seam, said latter portions are apt to be sealed together before the formation of moisture vapor occurs in the hem folds, thereby cutting off any avenue of escape for said vapor. Air and vapor in prohibitive quantities may be trapped within the seam and destroy the impervious character of the same or cause blisters to form therein after the release of the external sealing pressure. It may be noted that it is impossible for the trapped gases to escape through the non-porous, non-absorbent metallic lamination 6 without rupturing the same and thereby destroying the imperviousness of the container being constructed.

In order, therefore, to insure the imperviousness of seam 28 and for other purposes to appear more fully hereinafter, the face of iron 30 is preferably so shaped or contoured that heavy pressure is applied only to the U-shaped area of said seam which is bounded by lines $a$, $b$, $c$, and $d$ (Fig. 16). A lesser pressure is applied to the area 41 which is bounded by lines $a$ and $b$, thereby providing a vent for the gases referred to above. The pressure applied to area 41 is preferably only sufficient to tack a single-ply overlapping end of blank 5, 6 in position. The marginal end areas of seam 28 beyond lines $c$, are preferably not pressed or subjected to heat for the additional reason that it is highly desirable to avoid any ill effects which the heat might have on the adhesive coatings on the inner surfaces of hems 19 and 20 which coatings are to be subsequently employed, in a manner to hereinafter appear, for heat sealing the ends of tubular body T. Said marginal end areas of seam 28 are adapted to be sealed together at the same time that the end closure seams for the body are formed. It will be understood, however, that pressure and heat may be applied to the ends of seam 28 to seal the same at the same time that the central portion of said seam is sealed. Additionally, the face of sealing iron 30 may be and preferably is ribbed so as to press one or more longitudinal flutes 42 (Fig. 16) in the central portion of seam 28 to thereby further insure the hermeticity thereof and to obviate the formation of a vacuum or any sticking between the sealing iron and outer surface of the body being formed.

In Figs. 18 and 19 there are shown two alternative types of seams or junctures which may be made by practicing the methods and employing the means above described. In Fig. 18 the metallic lamina 6' is shown on the inside of the body and fibrous lamina 5' on the outside thereof. In Fig. 19, a simple paper-to-paper seam is illustrated. Fig. 20 illustrates one type of end closure seam which may be employed for closing the ends of body T, which seam will be hereinafter fully described.

After the formation of body T in the manner above described, one end thereof, preferably the end which will be hereinafter referred to as the top or upper end, may be closed and imperviously sealed by first folding the marginal portion 12, 19 of panels or sides 9 inwardly about fold line B and outwardly about fold line C, thereby forming a two-part end wall 12, 12 and bringing the inner metallic surfaces of the opposite halves of hem 19 into engagement, as best seen in Fig. 22, to form a projecting end closure flange or tab 43. At the same time, the marginal portions of side walls or panels 10 fold inwardly along lines E and F and outwardly along portions of lines B to form laterally projecting triangular tabs 44. It will be noted that opening means or string 22 is now disposed between engaging portions of hem 19, portion 22a of said string extending parallel to the top of the container and another portion extending outwardly at right angles thereto and being accessible for opening the container in a manner to be fully described.

In order to complete the top closure seam of the container, the opposed or engaging halves of the inner peripheral surface of hem 19 may be imperviously heat-sealed together by the application of heat and pressure to activate the dry film of lacquer or other adhesive coating on said engaging surfaces. Heretofore, a great amount of difficulty has been encountered in forming impervious heat sealed end closure seams in container bodies having side seams of the character of seam 28 particularly when the edge of said side seam within the container, such as edge 29 which passes through the end closure seam, comprises multiple thicknesses. The mere application of pressure is insufficient to satisfactorily seal such a seam in a manner to prevent leakage of air and moisture along such a multiple-ply edge. The present invention overcomes the problem of dealing with a multiple-ply edge in the end closure seam without interrupting the inner foil surface of hem 19, and hence without interrupting the foil-to-foil character of the end closure seam, by providing notches 8 in blank 5, 6. Thus, when body T is completed, that portion of edge 29 which extends across hem 19 is constituted by a single thickness of blank 5, 6 (Fig. 8).

It has been the universal practice heretofore in heat sealing the ends of containers, to press the opposite sides of the closure seam together with two equally heated sealing irons or with one heated iron and one cold iron or supporting plate. Neither of these methods have proved entirely satisfactory where impervious seams are required for reasons which have already been pointed out above in the discussion of heat sealing as applied to side seam 28. Accordingly, in order to prevent the formation of gases in the end closure seams which would prevent the proper sealing thereof, to minimize the storage of heat in the material of the seam which prevents quick-setting of the adhesive, and to insure proper activation of the sealing film, a novel method of heat sealing is employed. Said method comprises applying pressure to the opposite faces of seam 19, 19 by means of two sealing irons between which there is an appreciable differential in temperature. In the illustrated embodiment of the invention, heat and pressure are applied to opposite faces of tab 43 by means of sealing irons 45 and 46 (Fig. 12) and the latter, for best results, are maintained at different temperatures, such as approximately 450° F. and 300° F. respectively, by suitable electric heating elements 47 and 48. This differential in temperature insures a proper flow of heat through seam 43, that is, from iron 45 to iron 46, as well as quick and sufficient activation of the sealing film, and quick setting of the adhesive after retraction of the sealing irons. It will be understood that the end portion of seam 28 beyond the line c (Fig. 16) is sealed at the same time as end closure seam 43.

In order to further insure the imperviousness of the end closure seam, sealing irons 45 and 46 are preferably provided with one or more ribs and complementary grooves for embossing closure tab 43 as indicated at 49 (Figs. 10 and 22). Embossed groove or rib 49 may extend parallel to the end of the container and the embossed groove in female sealing iron 46 is preferably radially enlarged for receiving the extra thickness of material where seam 28 passes through seam 43, as at 50, thereby insuring a substantially even application of pressure throughout the length of the latter seam and hence assuring an hermetic closure. End closure seam 43 may also be embossed as indicated at 51, if desired, to afford additional assurance of an impervious seam. Preferably the application of pressure by the sealing irons terminates immediately above the portion 22a of string 22 and said irons are slightly relieved to allow for a portion of the thickness of said string where the latter passes through the end closure seam (Fig. 11), in order to prevent any cutting of the foil or paper thereby when pressure is applied. It will be noted that the portion of said string to which pressure is applied is flattened considerably by the sealing pressure and the possibility of leakage of air and moisture along the seam is removed by a caulking of lacquer thereabout.

After flange or tab 43 has been sealed in the manner above described, it may be folded flat against a portion of top wall 12 of the container, as illustrated in Fig. 23, with the major portion of the free end of string 22 tucked thereunder. The projecting ends of tab 43 and triangular tabs 44 are then bent downwardly against side walls 10 and secured in position either by adhesively tacking the same in place or by revenue stamp 52 or the like (Fig. 26) which may be placed over the entire top of the container and extend beyond the turned down tabs 44.

When the top of the container has been imperviously sealed in the above manner, the same may be filled with the desired contents, such as tobacco, through the open bottom end thereof and a flat secondary closure 53 (Fig. 24) may then be inserted in said open end against said contents to the plane of bending line B. Thereafter the marginal portion of the bottom of the container may be folded and sealed in the same manner as the top in order to form bottom closure tab or seam 54, which hermetically closes the bottom end of the container. During the closing of said bottom end, flat closure 53 serves as an internal support for the walls of the container body to insure orderly manipulation of the folds during the folding operation. After seam or tab 54 has been heat sealed, the same is folded down against the bottom wall 13 of the container and the projecting portions of said tab and triangular tabs 55 are preferably folded through 180° and tacked in position against the central portion of tab 54. Secondary closure 53 also serves as a foundation against which tabs 55 may be pressed when the same are tacked in place and has a firm base for the finished container, thereby preventing crushing of the end thereof and insuring a firm rectangular foundation upon which the container may set in upright position. To afford further assurance that the filled container will stand upright, bottom tabs 55 are tacked against the end of the container in a manner to provide bulges or legs 56 (Fig. 25). Also, by controlling the folding of the multiple-ply tabs 55 to provide bulges 56 any danger of breaking the foil component thereof during the folding of the same through 180° is substantially obviated.

The particular way in which blank 5, 6 is folded to form body T and the end closures of the container, is more fully set forth in my prior filed co-pending applications Serial Nos. 153,705 and 173,101, filed July 15, 1937, and November 6, 1937, respectively, and it is to be understood that the present invention is applicable to the various embodiments of the container set forth in said co-pending applications. While the preferred form of the container has been shown for the purpose of illustration as being formed from a laminated blank with a layer of metallic foil on the outside, it is to be understood that the blanks could be folded with the metal foil on the inside of the container (Fig. 18). When the latter construction is used, it becomes unnecessary to form top and bottom hems 19 and 20 in order to obtain metal-to-metal end closure seams, and opening string 22 is attached to the inner metallic foil surface adjacent the upper margin of the body.

When the container of Fig. 26 is to be opened for dispensing the contents thereof, revenue stamp 52 is first broken to permit the ends of sealing tab 43 together with end tabs 44 to be bent upwardly into the plane of the top wall 12, 12. Tab 43 is then bent into upstanding position, as shown in Fig. 22, and the free end of string 22 is grasped by the fingers and pulled outwardly or in the direction indicated by printed instructions on the package (Fig. 26). As the string is pulled between the juxtapositioned portions of said tab, the thermoplastic bond adjoining said portions in the area above horizontal leg 22a of the string is cleanly severed or sheared without any tearing of or damage to the material constituting the container. During this opening or shearing operation the inner end of the opening string is firmly anchored by the lacquer coating on it and foil layer 6 to at least one portion of tab 43, thereby obviating any danger of said string being pulled out of the seam without breaking the top closure seal. The separated portions of tab 43 may then be grasped by the fingers and pulled apart to break the remainder of the seal and expose the contents of the container. In this way the closure seal may be easily broken without rupturing or tearing the material, even though the latter be comparatively weak and fragile and a strong thermoplastic bond be employed. The container may be again temporarily closed without sealing the same by refolding the top margin in the manner in which it was originally folded.

There is thus provided a novel container comprising flexible fibrous materials which is light of weight, inexpensive to manufacture and impervious to both air and moisture and a novel method of fabricating said container said method including novel steps for rendering the fibrous component of the container less absorbent and novel steps whereby the seams therein are heat sealed in an impervious manner. The novel container comprehended by the invention is so constructed that the problem of dealing with multiple thicknesses of material in adhesively sealed seams or junctures is minimized, and the novel method of constructing the same renders it possible to consistently provide impervious containers with high speed machinery at low cost. Novel means on which a flexible fibrous container may stand in upright position are also provided as a part of the container and novel means are provided whereby the imperviously sealed end closure seam of a container may be readily opened without tearing the material from which the container is made.

Although only a limited number of embodiments of the invention are illustrated and described, it is to be expressly understood that the invention is not limited thereto. Various changes may be made, for example, in the particular materials and examples specified without departing from the spirit and scope of the invention as will now be readily understood by persons skilled in the art. For a definition in the limits of the invention, reference is had primarily to the appended claims.

What is claimed is:

1. In the art of making containers, the method which includes adhesively securing a sheet of metallic foil to a sheet of fibrous material throughout the contacting areas thereof to form a laminated blank, applying a film of wax to the exposed surface of said fibrous layer, baking said blank until said surface is substantially dry and free of a wax film, applying a film of thermoplastic adhesive to the exposed surface of said foil, drying said adhesive, embossing fold lines in said blank, folding marginal portions of the top, bottom and one end of said blank inwardly toward the fibrous lamina, wrapping said blank about a mandrel with the ends thereof in overlapping relation and said infolded margins innermost to form a tubular body, applying heat and pressure to said overlapping portions to activate the dry film of adhesive therebetween while yieldingly resisting deformation thereof, folding a marginal portion of said body to form an end wall and bring opposing halves of the inner peripheral foil surface of said margin into engagement to form a tab, and applying pressure and heat substantially above climatic temperatures to opposite sides of said tab, the heat applied to one side of said tab being of a substantially higher degree than that applied to the other side thereof.

2. A container body formed from a substantially rectangular blank comprising fibrous and metallic sheet material and having a notch in one end adjacent one side thereof, said blank having a marginal portion of said side folded inwardly to overlap said notch and having opposed ends thereof overlapped to cover said notch with the fibrous lamina and said infolded marginal portion innermost, said overlapping ends being joined by a thermoplastic adhesive.

3. A container formed from a substantially rectangular blank comprising fibrous and metallic sheet material and having a notch in one end adjacent one side thereof, said blank having a marginal portion of said side folded inwardly toward the fibrous lamina to form a hem overlapping said notch and having opposed ends thereof overlapped to cover said notch and joined by a thermoplastic adhesive to thereby form a substantially rectangular tubular body with the fibrous lamina and said infolded marginal portion innermost, said body having portions of two opposed side walls of said body adjacent said infolded margin folded inwardly to form a two-part end wall substantially perpendicular to said side walls, and opposed halves of the inner peripheral surface of said infolded marginal portion being joined by a thermoplastic adhesive to for man impervious closure seam.

4. A container formed from a substantially rectangular blank comprising fibrous and metallic sheet material and having a notch in one end adjacent one side thereof, said blank having a marginal portion of said side folded inwardly toward the fibrous lamina to form a hem overlapping said notch and having opposed ends thereof overlapped to cover said notch and joined by a thermoplastic adhesive to thereby form a substantially rectangular tubular body with the fibrous lamina and said inwardly folded marginal portion innermost, and a thermoplastic adhesive joining the opposed halves of the inner peripheral surface of said infolded marginal portion to form an impervious end closure seam.

5. In the art of making containers, the method which includes adhesively securing a sheet of metallic foil to a sheet of fibrous material throughout the contacting areas thereof to form a laminated blank, applying a film of wax to the exposed surface of said fibrous layer, baking said blank until said surface is substantially dry and free of wax, applying a film of thermoplastic adhesive to the exposed surface of said foil, drying said adhesive, embossing fold lines in said blank, folding marginal portions of the top, bottom and one end of said blank inwardly toward the fibrous lamina, wrapping said blank about a mandrel with the ends thereof in overlapping relation and said infolded margins innermost to form a tubular body, applying heat and pressure to said overlapping portions to activate the dry film of adhesive therebetween while yieldingly resisting deformation thereof, folding a marginal portion of said body to form a two-part end wall and bring opposing halves of the inner peripheral foil surface of said margin into engagement to form a tab, applying pressure and heat substantially above climatic temperatures to opposite sides of said tab, the heat applied to one side of said tab being of a substantially higher degree than that applied to the other side thereof, folding said tab down against said end wall, and folding the projecting ends of said tab inwardly and adhesively tacking the same to the central portion thereof, the folding of said projecting ends being controlled to form a bulge therein adjacent opposite sides of the container.

6. In the art of making containers, the method which includes cutting a notch in one end of a rectangular blank adjacent one side thereof, folding the marginal portion of said side to form a hem overlapping said notch, folding said blank to form a tubular container body with the ends thereof overlapped to cover said notch and with said folded marginal portion innermost, and adhesively securing said overlapped ends together.

7. In the art of making containers, the method which includes cutting a notch in one end of a rectangular blank adjacent one side thereof, folding the marginal portion of said side to form a hem overlapping said notch, folding said blank to form a tubular container body with the ends thereof overlapped to cover said notch, adhesively securing said overlapped ends together, and adhesively joining opposed halves of the inner peripheral surface of said hem to form an end closure seam.

8. In the art of making containers, the method which includes making a laminated blank comprising a layer of fibrous material and a layer of foil adhesively secured together by a heat-setting adhesive, impregnating said fibrous lamina with wax, folding said blank into container form, and adhesively sealing engaging surfaces of said fibrous and foil laminations together with thermoplastic lacquer.

9. In the art of making containers, the method which includes adhesively joining a layer of fibrous material and a layer of foil with a heat-setting adhesive to form a laminated blank, applying a film of wax to the exposed surface of said fibrous layer, baking said blank until said surface is substantially dry and free of a wax film, and folding said blank into container form.

10. In the art of making containers, the method which includes adhesively joining a layer of fibrous material and a layer of foil with a heat-setting adhesive to form a laminated blank, applying a film of wax to the exposed surface of said fibrous layer, baking said blank until said surface is substantially dry and free of wax, folding said blank into container form, and adhesively sealing engaging surfaces of said fibrous and foil laminations together.

11. In the container making art, the method which comprises placing materials in overlapping relation with a dry film of thermoplastic adhesive interposed therebetween and applying pressure and heat substantially higher than climatic temperatures to opposite sides of the overlapping portions of said materials, the heat applied to one side being of a substantially higher degree than that applied to the other side.

12. In the art of making containers, the method which includes adhesively securing a sheet of metallic foil to a sheet of fibrous material throughout the contacting areas thereof to form a laminated blank, cutting a notch in one end of said blank adjacent one side thereof, applying a film of wax to the exposed surface of said fibrous layer, baking said blank until said surface is substantially dry and free of wax, applying a film of thermoplastic adhesive to the exposed surface of said foil, drying said adhesive, folding the marginal portion of said side inwardly toward the fibrous layer to form a hem overlapping said notch, folding said blank to form a tubular container body with the ends of the blank overlapped to cover said notch and with said folded marginal portion innermost, adhesively securing said overlapped ends together, pressing opposed halves of the inner peripheral surface of said infolded marginal portion into engagement to form a tab, and applying pressure and heat substantially above climatic temperatures to opposite sides of said tab to activate the dry adhesive film on the engaging surfaces thereof, the heat applied to one side of said tab being of a substantially higher degree than that applied to the other side thereof.

13. A container constituted by a rectangular blank, said blank being folded to form an open ended body having a substantially rectangular cross-section, the overlapping ends of the blank being joined by an adhesive, and a marginal portion at the open end of the body being folded to form an end wall perpendicular to the side walls of the body and a tab with opposed halves of an inner peripheral surface of said marginal portion in engagement, said tab being folded to cause the central portion thereof to engage said end wall, and the projecting ends of said tab being folded into engagement with and secured to said central portion to form bulges adjacent opposite sides of the container.

14. A container constituted by a body comprising fibrous materials and having a substantially rectangular cross-section, a peripheral band portion of said body being folded to form a two-part end wall perpendicular to the side walls of the body and a pair of triangular tabs over-hanging opposed sides of said body, and a marginal portion of the body adjacent said band portion having opposed halves of the inner peripheral surface thereof pressed into engagement to form an end closure tab, said end closure tab being folded down against said end wall, and said triangular tabs and projecting portions of said closure tab being folded to form bulges projecting from the end of the container and having the ends thereof adhesively secured to the central portion of said closure tab.

15. A container constituted by a laminated blank comprising foil and fibrous laminations adhesively secured together by a heat-setting adhesive, said fibrous lamina being substantially impregnated with paraffin wax to render the same moisture repellent and having the exposed surface thereof substantially dry and free of wax.

16. A container constituted by a laminated blank comprising a foil lamina and a fibrous lamina adhesively secured together by a heat-setting adhesive, said fibrous lamina being substantially impregnated with paraffin wax to render the same moisture repellent, and the exposed surface of said fibrous lamina being substantially dry and having an affinity for adhesives.

GEORGE ARLINGTON MOORE.